3,177,608
ANIMAL TRAP
William A. Lindelow, 421 Newbold Road,
Jenkintown, Pa.
Filed Dec. 19, 1963, Ser. No. 331,854
6 Claims. (Cl. 43—61)

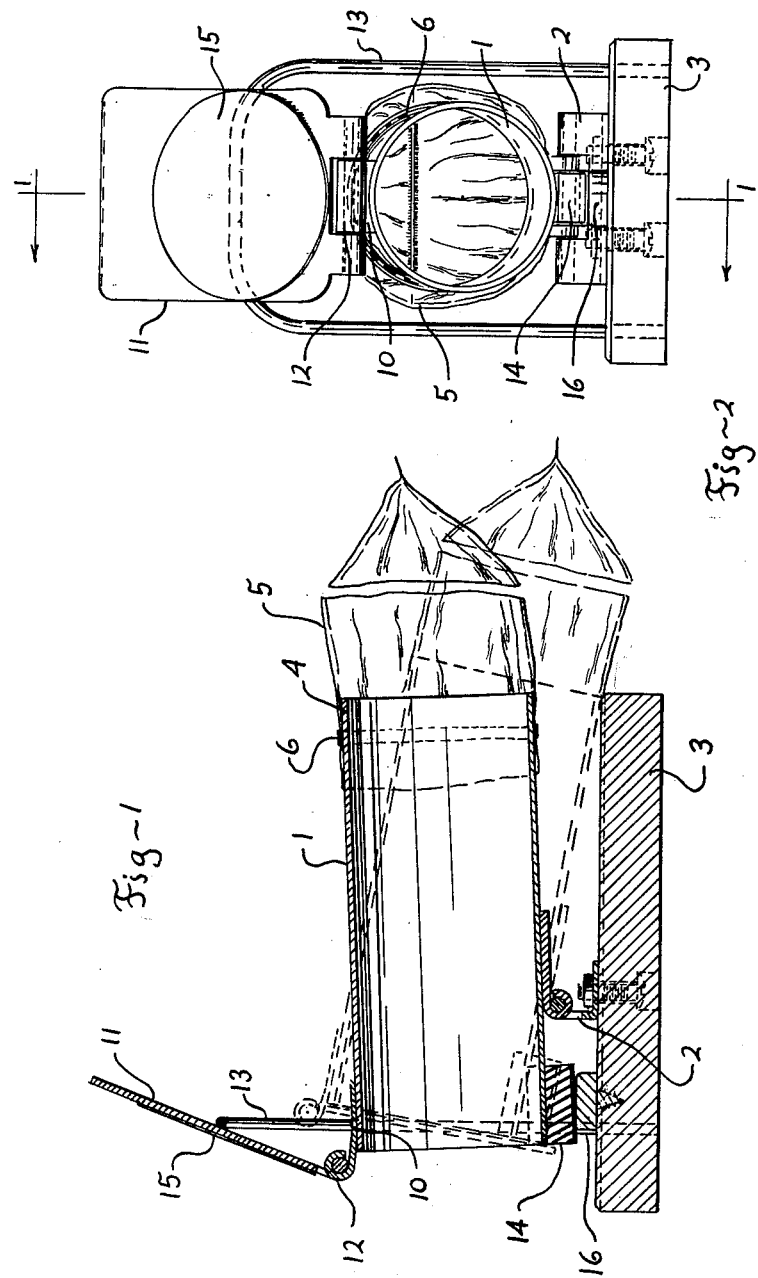

This invention relates to animal traps and in particular relates to traps for catching small rodents, such as rats, mice and the like.

The principal object of the invention is to provide a trap which will deprive the rodent of life without a physical blow and which will permit the body to be disposed of without being touched by the hands.

The invention contemplates means for luring a rodent into a disposable bag, then sealing the entrance to the bag to cause asphyxiation, the bag with its dead rodent is then removed from the trap and disposed of.

One object of the invention is to provde a trap that is sanitary in that the rodent is killed without a physical blow so as to avoid spilling of blood or other remains.

Another object of the invention is to provide a rodent trap that is sanitary in that the dead rodent can be quickly and conveniently disposed of without having to handle the rodent with the hands.

Another object of the invention is to provide a trap which is humane in its characteristics in that the animal is asphyxiated rather than being struck by an instrumentality which may not always cause instantaneous death.

Another object of the invention is to provide a trap which is safe to use in that there are no spring-loaded hammers or the like.

Another object of the invention is to provide an animal trap which is easy and convenient to use in that it can be arranged in the set position even by a small child.

Another object of the invention is to provide an animal trap which is silent and sure in operation.

Another object of the invention is to provide an animal trap of the characteristics described above which is relatively inexpensive to manufacture.

A preferred form of the invention will be described below in connection with the following drawings wherein:

FIGURE 1 is a side view taken along the lines 1—1 of FIGURE 2, the view being a side elevation partially in section; and FIGURE 2 is a front elevation view looking into the mouth of the trap.

In FIGURE 1 a hollow elongated tube 1 is mounted on a hinge or pivot structure 2 supported by a base 3. On the right hand end 4 of the tube is a plastic bag means 5 which is held on the tube by the rubber band 6.

The hinge structure 2 permits the tube to tilt counter-clockwise to the position shown by the full lines. This is the set position; i.e., a position wherein the trap is arranged so that an animal or rodent can move into the tube via the end 10 through the tube and thence into the disposable bag 5. The bag 5 is usually provided with bait to lure the rodent.

The pivot also permits the tube to tilt clockwise to the position shown by the dotted lines. This is the catch position; i.e., a position wherein the rodent is locked within the tube and disposable bag.

The door 11 is connected to the top of the tube by the hinge mechanism 12. When the tube is in the set position, the door extends upwardly or is in an open position as shown. In this position, the door is engaged with the door release means 13.

When the tube is in the catch position (dotted lines) the door extends downwardly closing off the end 10 of the tube. This is the closed position of the door.

The door is caused to move downwardly to the closed position by virtue of the tilting of the tube and the engagement between the door and the release means 13. With reference to FIGURE 1, it will be apparent that when the tube moves clockwise to a point where the hinge mechanism 12 passes by the release 13, the engagement between door and release will have the effect of camming the door downwardly so that gravity will take effect and cause the door to swing downwardly.

The pivot 2 is connected to the tube 1 so that in the set position, the moment arms on the left and right hand sides of the pivot cause the tube to tilt in the counter-clockwise direction. When a rodent enters the tube and moves past the pivot point, the moment arms are unbalanced to the extent that the tube is caused to pivot in the clockwise direction to the catch position. It will be understood that the tube can be put in the set position simply by tilting counterclockwise and putting the door 11 against the release 13.

The door is held in the closed position by the ceramic permanent magnet 14 which imposes a substantial attracting force on the metal door 11.

In the closed position, the door effectively seals off the interior of the tube and bag. Hence, a rodent on the inside is asphyxiated. In order to enhance the cut off of air, I prefer to mount a thin rubber sheet 15 on the inside of the door and this engages the end of the tube when the door is in down position and contributes to the sealing function. The use of the rubber sheet is also advantageous in that highly precise manufacturing tolerances are unnecessary to obtain the sealing function.

As will be apparent, I have provided an abutment 16 secured to the base 3 and this abutment engages the magnet 14 and defines the limit of the set position of the tube 1. The engagement between tube 1 and base 3 defines the limit of the catch position.

Referring to the disposable bag means 5, I prefer to use two bags, one inside of the other with the inside bag having a wall thickness which is substantially less than the wall thickness of the outer bag. This is particularly useful because in many instances the rodent will attempt to gnaw through the bag. The thinness makes the gnawing process relatively easy. However, I have found that when the rodent starts to gnaw holes, he becomes enmeshed or entangled in the bag and rarely, if ever, can gnaw through the outer bag.

Preferably the bags are of an opaque color so that the rodent inside cannot be seen. This makes the disposal problem more palatable especially to housewives.

For disposing of a dead rodent, the trap is picked up and turned upright with the bag hanging down and then the bag is grasped near the top and simply pulled off of the tube. The bag then can be given a twist and thrown into the trash or into an incinerator. A new bag is then connected with the tube and the trap is ready for operation.

I claim:
1. An animal trap comprising:
   a base;
   a hollow tube made of air-tight material, the hollow structure being a passageway permitting an animal to move through the tube;
   means substantially hermetically sealing one end of said tube;
   pivot means connecting said tube to said base and providing for the tube to tilt in one direction to a set position and in the opposite direction to a catch position;
   a door made of air-tight material for closing off the other end of the tube;
   hinge mechanism connecting the door with the tube and providing for the door to swing between an open posi- tion and a closed position, said pivot means being located so that the moment arms on the opposite sides of the pivot means cause the tube to tilt to the set position and so that the weight of an animal moving through the tube will effect unbalance of the moment arms and cause the tube to tilt to the catch position;

door release means connected with said base for engaging the door when the tube is in said set position and to cause the door to swing toward its closed position when the tube is tilting toward the catch position;

a resilient sheet on said door adapted to engage the other end of the tube and substantially hermetically seal the same when the door is in closed position and said resilient sheet and said means substantially hermetically sealing said one end of the tube providing for the hermetic sealing of the tube so as to asphyxiate an animal confined within the tube;

and latch means to engage and hold the door when the door is in the closed position, the latch means including a permanent magnet adjacent said other end of the tube and magnetizable material on said door which is attracted and held by the magnet when the door is in the closed position.

2. A construction in accordance with claim 1 wherein said means for substantially hermetically sealing said one end of the tube includes a disposable, air-tight bag disposed over said one end of the tube and a rubber band holding the bag on the tube.

3. A construction in accordance with claim 1 wherein said means for substantially hermetically sealing said one end of the tube includes a pair of disposable bags one inside of the other, both of the bags being disposed over said one end and a rubber band holding the bags on the tube, the wall thickness of the inner bag being substantially less than the wall thickness of the outer bag.

4. In an animal trap, the combination of a tube having a flexible bag removably mounted on one end and a door on the opposite end, the tube and bag being adapted to receive an animal, together with means supporting the tube with the door in an open position and providing for an animal entering the tube to cause the tube to tilt to effect closure of the door, the tube, the bag and the door all being made of air-tight material and the door and the bag sealing the tube to an extent to cause asphyxiation of the animal.

5. In an animal trap, the combination of a plurality of flexible bags one inside the other, the inside bag having substantially smaller wall thickness than the outside bag, a tube extending inside of said bags and a rubber band removably securing the bags on the tube, the tube and bags being adapted to receive an animal, together with door means operative after an animal has entered the tube to close the other end of the tube, the tube, the bags and the door means all being made of air-tight material and the door and the bag sealing the tube to an extent to cause asphyxiation of the animal.

6. In an animal trap, the combination of a flexible bag, a tube extending inside of the bag, a rubber band removably securing the bag on the tube, the tube and bag being adapted to receive an animal, together with door means operative after an animal has entered the tube to close the other end of the tube, the tube, the bag and the door means all being made of air-tight material and the door and the bag sealing the tube to an extent to cause asphyxiation of the animal.

References Cited by the Examiner

UNITED STATES PATENTS

| | | | |
|---|---|---|---|
| 1,597,551 | 8/26 | Stewart | 43—69 |
| 2,541,681 | 2/51 | Andrews | 43—61 |
| 2,885,820 | 5/59 | Maggio | 43—61 |
| 3,058,257 | 10/62 | Brophy et al. | 43—139 |

ABRAHAM G. STONE, *Primary Examiner.*